(12) United States Patent
Kishida et al.

(10) Patent No.: US 11,886,520 B2
(45) Date of Patent: *Jan. 30, 2024

(54) DATA SEARCH APPARATUS, AND DATA SEARCH METHOD AND PROGRAM THEREOF, AND EDGE SERVER AND PROGRAM THEREOF

(71) Applicant: NTT Communications Corporation, Tokyo (JP)

(72) Inventors: Tsunechika Kishida, Yokohama (JP); Hideaki Akabori, Yokohama (JP); Tatsuo Fujita, Yokohama (JP)

(73) Assignee: NTT Communications Corporation, Tokyo (JP)

( * ) Notice: Subject to any disclaimer, the term of this patent is extended or adjusted under 35 U.S.C. 154(b) by 137 days.

This patent is subject to a terminal disclaimer.

(21) Appl. No.: 17/299,240

(22) PCT Filed: Dec. 6, 2019

(86) PCT No.: PCT/JP2019/047817
§ 371 (c)(1),
(2) Date: Jun. 2, 2021

(87) PCT Pub. No.: WO2020/116610
PCT Pub. Date: Jun. 11, 2020

(65) Prior Publication Data
US 2022/0043867 A1 Feb. 10, 2022

(30) Foreign Application Priority Data

Dec. 6, 2018 (JP) .................................. 2018-229020

(51) Int. Cl.
*G06F 16/953* (2019.01)
*H04L 67/1097* (2022.01)

(52) U.S. Cl.
CPC ........ *G06F 16/953* (2019.01); *H04L 67/1097* (2013.01)

(58) Field of Classification Search
CPC .......................... G06F 16/953; H04L 67/1097
(Continued)

(56) References Cited

U.S. PATENT DOCUMENTS 6,874,017 B1 * 3/2005 Inoue ...................... H04L 67/02
709/219
7,490,073 B1 * 2/2009 Qureshi ................. G06N 5/048
706/56

(Continued)

FOREIGN PATENT DOCUMENTS

| CN | 103116598 A | 5/2013 |
| CN | 107870916 A | 4/2018 |

(Continued)

OTHER PUBLICATIONS

Extended European Search Report for EP Application No. 19893078.6, dated Jan. 4, 2022, 9 pages.

(Continued)

*Primary Examiner* — Mark E Hershley
(74) *Attorney, Agent, or Firm* — Knobbe, Martens, Olson & Bear, LLP

(57) ABSTRACT

A system using edge computing is enabled to efficiently acquire data of an acquisition target without fail. A data search server KSV includes an industry information table 221 which stores an edge ID of an edge server operated and managed by a company/body, the edge ID being correlated with an industry ID which identifies an industry, and an ID of the company/body belonging to the industry. When a data acquisition request designating the industry ID is received from a user terminal, edge servers correlated with the designated industry ID are searched from the industry infor- (Continued)

mation table 221, and sensing data is acquired from the searched edge servers and transmitted to the user terminal of the source of the request. Menu screen information is sent from the data search server KSV to the user terminal, and displayed, and a user is enabled to select an industry on the menu screen.

8 Claims, 9 Drawing Sheets

(58) Field of Classification Search
USPC .......................................................... 707/770
See application file for complete search history.

(56) References Cited

U.S. PATENT DOCUMENTS

| | | | | |
|---|---|---|---|---|
| 7,809,909 | B2* | 10/2010 | Iwamura | G06F 11/2082 |
| | | | | 709/217 |
| 8,566,549 | B1* | 10/2013 | Burke | G06F 3/0644 |
| | | | | 711/114 |
| 9,167,036 | B2* | 10/2015 | Seed | H04L 67/568 |
| 9,614,852 | B2* | 4/2017 | Kiriyama | G06F 21/6218 |
| 9,898,539 | B2* | 2/2018 | Kawamura | G06F 16/9537 |
| 9,910,470 | B2* | 3/2018 | Garg | G06F 1/26 |
| 10,118,296 | B1 | 11/2018 | Gennis et al. | |
| 10,678,941 | B2* | 6/2020 | Ohsaki | G06F 21/6254 |
| 10,922,325 | B2* | 2/2021 | Yamato | G06F 16/24578 |
| 11,102,123 | B2 | 8/2021 | Ohuchi | |
| 11,443,390 | B1* | 9/2022 | Caligaris | G06Q 40/125 |
| 11,514,532 | B1 | 11/2022 | Biasiolli et al. | |
| 2002/0052915 | A1* | 5/2002 | Amin-Salehi | H04Q 11/0407 |
| | | | | 709/203 |
| 2002/0069420 | A1* | 6/2002 | Russell | G06Q 10/10 |
| | | | | 725/92 |
| 2003/0115421 | A1* | 6/2003 | McHenry | H04L 67/5682 |
| | | | | 711/158 |
| 2003/0140207 | A1 | 7/2003 | Nagase et al. | |
| 2005/0114730 | A1 | 5/2005 | Iwamura et al. | |
| 2007/0078943 | A1* | 4/2007 | Daniels | G06F 15/16 |
| | | | | 709/217 |
| 2007/0157288 | A1* | 7/2007 | Lim | H04L 63/105 |
| | | | | 726/1 |
| 2007/0169168 | A1* | 7/2007 | Lim | G06F 11/3438 |
| | | | | 726/1 |
| 2008/0060051 | A1* | 3/2008 | Lim | G06F 16/93 |
| | | | | 726/1 |
| 2010/0070448 | A1* | 3/2010 | Omoigui | H01L 27/1463 |
| | | | | 706/55 |
| 2012/0069131 | A1* | 3/2012 | Abelow | G06Q 30/0601 |
| | | | | 345/589 |
| 2012/0317366 | A1* | 12/2012 | Sato | G06F 3/0647 |
| | | | | 711/141 |
| 2013/0124615 | A1 | 5/2013 | Sekiguchi et al. | |
| 2013/0204997 | A1* | 8/2013 | Eggleston | H04L 41/00 |
| | | | | 709/223 |
| 2014/0277788 | A1* | 9/2014 | Forbes, Jr. | H02J 3/14 |
| | | | | 700/286 |
| 2015/0271295 | A1* | 9/2015 | Mahoney | H04L 67/02 |
| | | | | 709/203 |
| 2015/0381927 | A1 | 12/2015 | Mourning et al. | |
| 2016/0112263 | A1* | 4/2016 | Henry | G01R 31/08 |
| | | | | 370/250 |
| 2016/0204990 | A1* | 7/2016 | Shattil | H04L 67/1021 |
| | | | | 370/252 |
| 2016/0287189 | A1* | 10/2016 | Modai | A61B 5/0022 |
| 2017/0053032 | A1* | 2/2017 | Liongosari | G06Q 30/0201 |
| 2017/0134239 | A1* | 5/2017 | Mahoney | H04L 69/22 |
| 2017/0160951 | A1 | 6/2017 | Borlick et al. | |
| 2017/0329533 | A1 | 11/2017 | Agombar et al. | |
| 2017/0353367 | A1* | 12/2017 | Slaight | H04L 43/10 |
| 2017/0366513 | A1* | 12/2017 | Kumaran | H04L 63/0421 |
| 2018/0026913 | A1* | 1/2018 | Balle | G11C 5/02 |
| | | | | 709/226 |
| 2018/0088870 | A1 | 3/2018 | Lv et al. | |
| 2018/0150489 | A1* | 5/2018 | Yamazaki | G06F 3/067 |
| 2018/0167434 | A1* | 6/2018 | Sathyanarayana | H04L 67/146 |
| 2018/0284758 | A1* | 10/2018 | Cella | G06N 5/046 |
| 2018/0293587 | A1* | 10/2018 | Oda | G06Q 30/06 |
| 2019/0036830 | A1* | 1/2019 | Yamato | H04M 11/00 |
| 2019/0041835 | A1* | 2/2019 | Cella | G05B 23/024 |
| 2019/0044812 | A1* | 2/2019 | Loftus | H04L 41/0895 |
| 2019/0080197 | A1* | 3/2019 | Kato | G06F 21/44 |
| 2019/0208006 | A1* | 7/2019 | Chen | H04L 67/10 |
| 2019/0281078 | A1* | 9/2019 | Eguiarte Salazar | H04L 63/162 |
| 2019/0281132 | A1 | 9/2019 | Sethuraman et al. | |
| 2020/0344299 | A1 | 10/2020 | Sohail et al. | |
| 2022/0038535 | A1 | 2/2022 | Kishida et al. | |
| 2022/0075563 | A1 | 3/2022 | Kishida et al. | |

FOREIGN PATENT DOCUMENTS

| | | |
|---|---|---|
| JP | 2000-276425 A | 10/2000 |
| JP | 2003-085032 A | 3/2003 |
| JP | 2005-534087 A | 11/2005 |
| JP | 2007-41660 A | 2/2007 |
| JP | 2015-176350 A | 10/2015 |
| JP | 2016-085522 A | 5/2016 |
| JP | 2016-139354 A | 8/2016 |
| JP | 2017-84134 A | 5/2017 |
| JP | 2017-167748 A | 9/2017 |
| JP | 2018-81377 A | 5/2018 |
| JP | 2020-009170 A | 1/2020 |
| WO | WO2012/0164671 A1 | 12/2012 |
| WO | WO2013/153890 A | 10/2013 |
| WO | WO2014/045699 A1 | 3/2014 |
| WO | WO 2018/180369 A1 | 10/2018 |
| WO | WO 2020/116610 A1 | 6/2020 |
| WO | WO 2020/116611 A1 | 6/2020 |
| WO | WO 2020/116612 A1 | 6/2020 |
| WO | WO 2021/035084 A1 | 2/2021 |

OTHER PUBLICATIONS

Extended European Search Report for EP Application No. 19893830.0, dated Jan. 4, 2022, 10 pages.
Extended European Search Report for EP Application No. 19893316.0, dated Dec. 10, 2021, 7 pages.
International Search Report and Written Opinion for PCT Application No. PCT/JP2019/047817, dated Mar. 10, 2020 in 13 pages.
International Preliminary Report on Patentability for Application No. PCT/JP2019/047817, dated Jun. 17, 2021 in 11 pages.
International Search Report and Written Opinion for PCT Application No. PCT/JP2019/047818, dated Mar. 10, 2020 in 15 pages.
International Preliminary Report on Patentability for PCT Application No. PCT/JP2019/047818, dated Jun. 17, 2021 in 13 pages.
International Search Report and Written Opinion for PCT Application No. PCT/JP2019/047819, dated Feb. 18, 2020 in 13 pages.
International Preliminary Report on Patentability for PCT Application No. PCT/JP2019/047819, dated Jun. 17, 2021 in 11 pages.
Atsushi Terauchi et al., Grappling with data exchange technology which provides real-time scalability of computation processing, [online], NTT Technical Journal, Jul. 2017, pp. 19-23, Internet <URL:http://www.ntt.co.jp/journal/1707/files/JN20170719.pdf>.
International Search Report for PCT Application No. PCT/JP2019/047817, dated Mar. 10, 2020 in 5 pages.
International Search Report for PCT Application No. PCT/JP2019/047818, dated Mar. 10, 2020 in 5 pages.
International Search Report for PCT Application No. PCT/JP2019/047819, dated Feb. 18, 2020 in 5 pages.
Japanese Office Action for JP Application No. 2018-229020, dated Jun. 7, 2022, 8 pages.
Japanese Office Action for JP Application No. 2018-228987, dated Jun. 7, 2022, 7 pages.
International Preliminary Report on Patentability for Application No. PCT/JP2019/047817, dated Jun. 8, 2021 in 7 pages.
U.S. Appl. No. 17/299,235, filed Jun. 2, 2021, Data Search Apparatus, and Data Search Method and Program Thereof, and Edge Server and Program Thereof.

(56) References Cited

OTHER PUBLICATIONS

U.S. Appl. No. 17/299,185, filed Jun. 2, 2021, Storage Management Apparatus, Method and Program.
Xialong, L. et al., "Resource Information Retrieval Method and Application Based on Name Service in the Internet of Things", Chinese Master's Theses Full-Text Database Information Science and Technology, Mar. 2017, Issue 03, 64 pages.
Chinese Office Action for CN Application No. 201980080474.2, dated Sep. 28, 2023, 32 pages.
Chinese Office Action for CN Application No. 201980080545.9, dated Oct. 25, 2023, 21 pages.

* cited by examiner

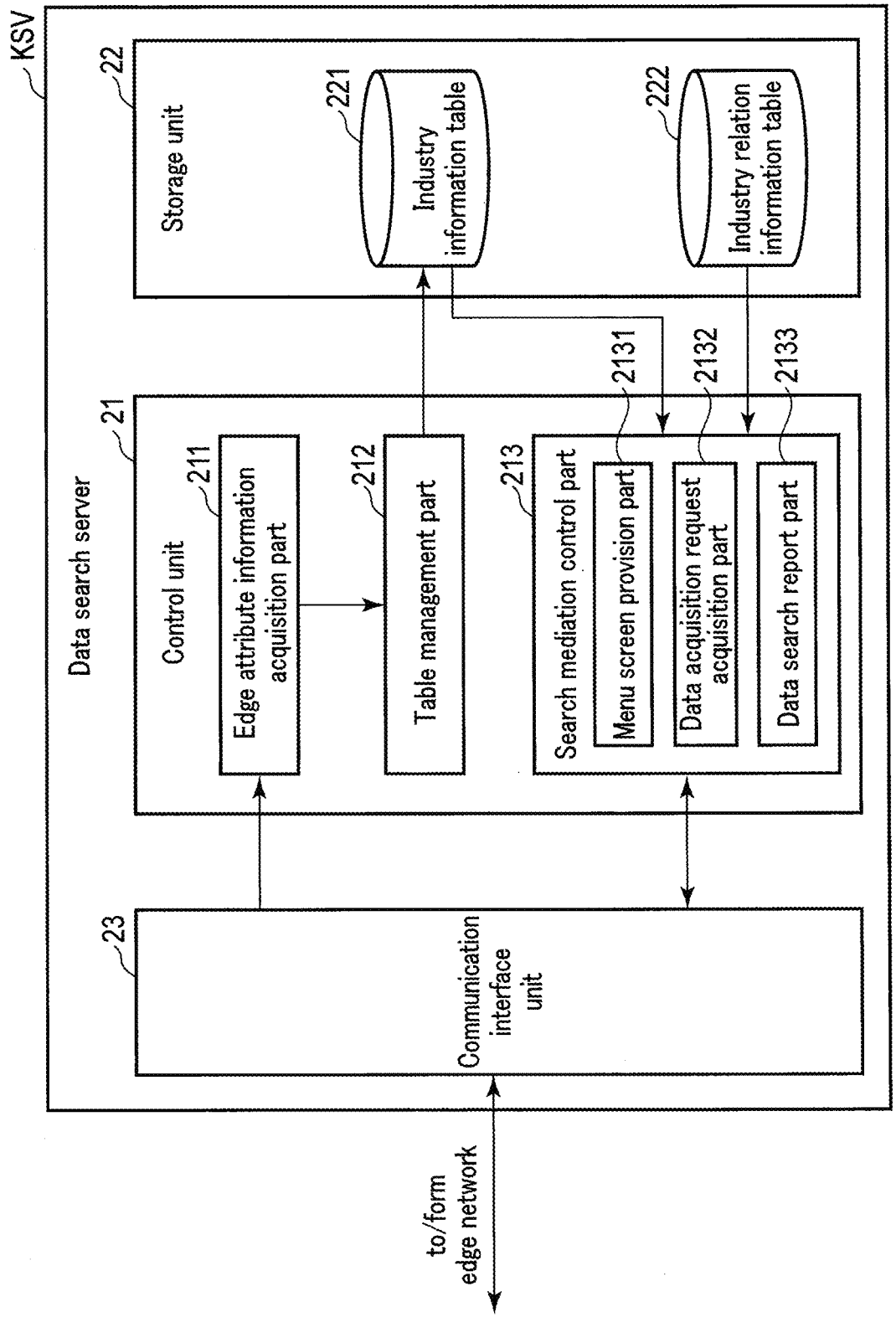
F I G. 3

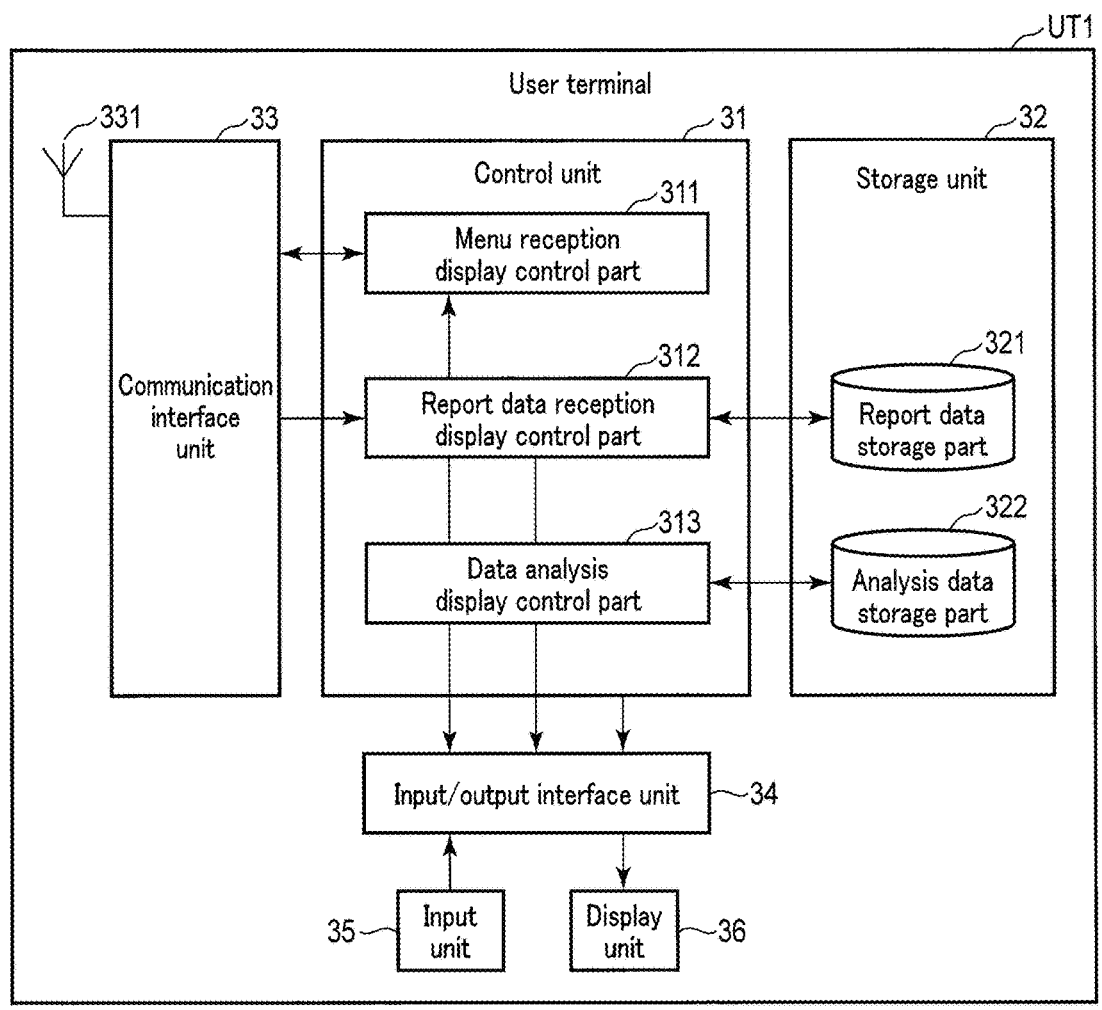
F I G. 4

<Industry information table>

| Industry ID | Company/body ID | Edge ID |
|---|---|---|
| A | a1, a2, a3 | Ea11, Ea12<br>Ea21<br>Ea31, Ea32 |
| B | b1, b2 | Eb11, Eb21<br>Eb22 |
| C | c1, c2, c3, c4 | Ec11, Ec12<br>Ec21, Ec22<br>Ec31<br>Ec41 |
| ⋮ | ⋮ | ⋮ |

F I G. 5

<Industry relation information table>

| Industry ID | Related industry ID |
|---|---|
| A | C, D |
| B | C |
| C | A, B, E |
| D | A |
| ⋮ | ⋮ |

F I G. 6

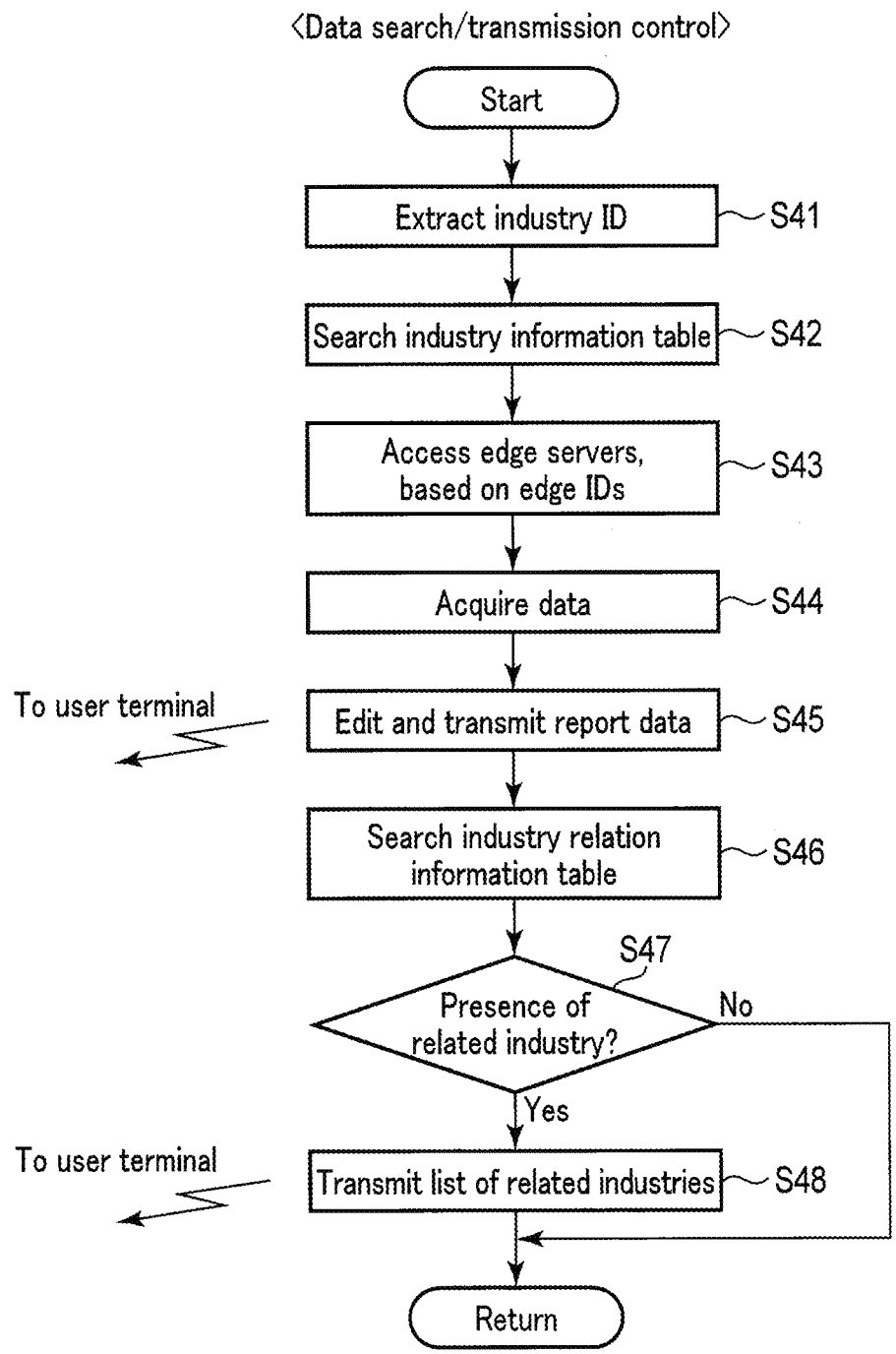
F I G. 10

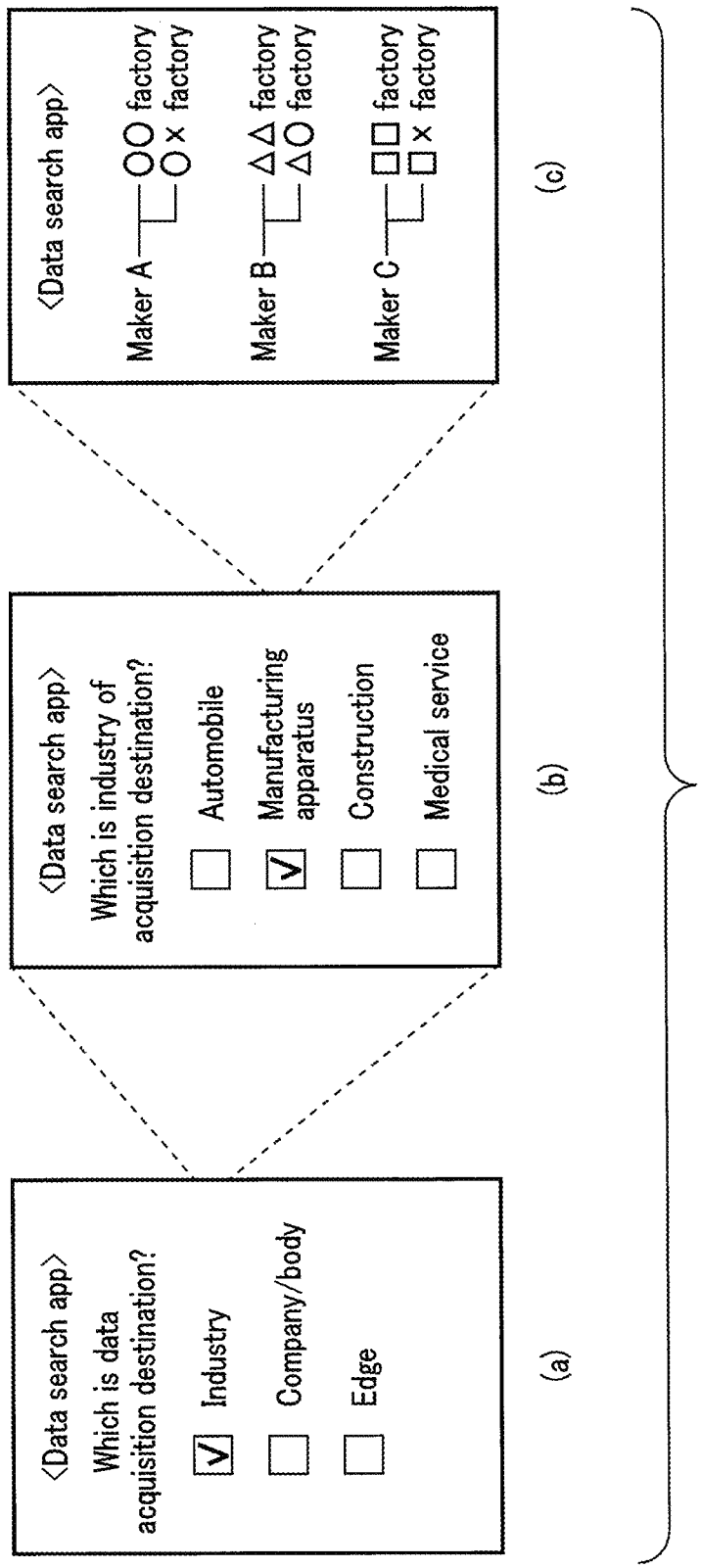
F I G. 11

DATA SEARCH APPARATUS, AND DATA SEARCH METHOD AND PROGRAM THEREOF, AND EDGE SERVER AND PROGRAM THEREOF

This is a U.S. national phase application under 35 USC 371 of International Application No. PCT/JP2019/047817 (not published in English), filed Dec. 6, 2019.

FIELD

One mode of the present invention relates to a data search apparatus, and a data search method and a program thereof, and an edge server and a program thereof, which are used in a data circulation system utilizing edge computing.

BACKGROUND

In recent years, attention has been paid to a data circulation system using IoT (Internet of Things) technology, in which, for example, devices including various sensors are connected to a network and sensing data is collected from these devices and utilized.

In the data circulation system using the IoT technology, it is indispensable to utilize various IoT data in combination, in order to further enhance the value creation, and there is an increasing demand for the realization of "IoT data exchange society" which circulates and utilize the IoT data across services. In order to meet the demand, IoT data exchange technology, which exactly and scalably transmits IoT data from various kinds of devices to various applications, is important.

Under the circumstances, edge computing has been proposed. In the edge computing, a plurality of edge servers are distributedly arranged at peripheral parts of a carrier network. The edge server includes an arithmetic processing function and a storage function, and executes an application program and stores content data. A user, who intends to utilize IoT data, accesses each edge server from his/her own terminal, searches data, and acquires desired IoT data (see, e.g. NPL 1).

CITATION LIST

Non Patent Literature

NPL 1: Atsushi TERAUCHI, Kenichi OHTO, Noriuchi TAKAHASHI, Kei HARADA, Ikuo YAMAZAKI, "Grappling with data exchange technology which provides real-time scalability of computation processing", [online], NTT Technical Journal, July 2017, pp. 19-23, Internet <URL: http://www.ntt.co.jp/journal/1707/files/JN20170719.pdf>

SUMMARY

Technical Problem

With a system using edge computing, data can be acquired with a less propagation delay than in the case where IoT data is all acquired from a cloud. However, if the number of edge computers that are disposed increases in accordance with an expansion of the system, the user has to individually access many edge computers in order to acquire data of a field that is an analysis target, and a great deal of time and labor is needed to acquire desired data. Moreover, since a failure to acquire data tends to easily occur, a deterioration in analysis precision of data, or the like, is unavoidable.

The present invention has been made by paying attention to the above circumstances, and the object of the invention is to provide a technology which can efficiently acquire, without fail, data of an acquisition target in a system using edge computing.

Solution to Problem

In order to achieve the above object, according to a first mode of a data search apparatus relating to the present invention, there is provided a data search apparatus connectable via a network to a plurality of data accumulation apparatuses functioning as a data provision side and to a terminal functioning as a data acquisition side, the data search apparatus including: a storage medium configured to correlate and store, when the data accumulation apparatuses functioning as the data provision side belong to a plurality of groups in a distributed fashion, information which identifies the data accumulation apparatuses, and identification information of a group to which the data accumulation apparatuses belong; a data search operation support part configured to transmit support information of a data search operation to the terminal functioning as the data acquisition side, and to receive a data acquisition request including identification information of a group that is a data acquisition target, the data acquisition request being transmitted from the terminal functioning as the data acquisition side in accordance with the support information; a data collection part configured to search, from the storage medium, a data accumulation apparatus belonging to a group corresponding to the identification information of the group included in the received data acquisition request, and to collect accumulated data from the searched data accumulation apparatus; and a data transmission part configured to transmit the collected data to the terminal which is a transmission source of the data acquisition request.

According to a second mode of the data search apparatus relating to the present invention, there is provided a data search apparatus connectable via a network to a plurality of edge servers functioning as a data provision side and to a terminal functioning as a data acquisition side, the edge servers being configured to receive and accumulate data transmitted from a plurality of devices, the data search apparatus including: a storage table configured to correlate and store information which identifies the edge servers, and information which identifies an organization to which an owner of the devices which transmit the data to the edge servers belongs; a data search operation support part configured to transmit support information of a data search operation to the terminal functioning as the data acquisition side, and to receive a data acquisition request including identification information of an organization that is a data acquisition target, the data acquisition request being transmitted from the terminal functioning as the data acquisition side in accordance with the support information; an edge server search part configured to search, when receiving a data acquisition request including the identification information of the organization from the terminal functioning as the data acquisition side, identification information of an edge server, which is correlated with the identification information of the organization included in the data acquisition request, from the storage table; a data collection part configured to collect, based on the searched identification information of the edge server, the accumulated data from the corresponding edge server; and a data transmission part configured to transmit via the network the collected data to the terminal which is a transmission source of the data acquisition request.

According to a third mode of the data search apparatus relating to the present invention, the data search operation support part is configured to transmit menu screen information including a list of a plurality of organizations which are candidates of a data acquisition target, and to receive a data acquisition request including identification information of an organization selected from among the organizations included in the list.

According to a fourth mode of the data search apparatus relating to the present invention, the data search operation support part includes: a first support processing part configured to transmit, when the organization includes a plurality of layers, first menu information including a list of the layers of the organization, and to receive a first request including identification information of a layer selected from the list of the layers included in the first menu information; and a second support processing part configured to transmit second menu information including a list of a plurality of organizations included in a layer represented by the identification information of the layer included in the received first request, and to receive a second request including identification information of an organization selected from the list of the organizations included in the second menu information.

According to a first mode of an edge server relating to the present invention, there is provided an edge server which is a specific edge server of a plurality of edge servers capable of receiving and accumulating data transmitted from a plurality of devices and capable of executing data transmission among the edge servers, the edge server including: a storage table configured to correlate and store information which identifies the edge servers, and information which identifies an organization to which an owner of the devices which transmit the data to the edge servers belongs; a data search operation support part configured to transmit support information of a data search operation to a terminal functioning as a data acquisition side, and to receive a data acquisition request including identification information of an organization that is a data acquisition target, the data acquisition request being transmitted from the terminal functioning as the data acquisition side in accordance with the support information; an edge server search part configured to search, from the storage table, identification information of an edge server which is correlated with the identification information of the organization included in the received data acquisition request; a data collection part configured to collect, based on the searched identification information of the edge server, the accumulated data from the corresponding edge server; and a data transmission part configured to transmit via the network the collected data to the terminal which is a transmission source of the data acquisition request.

Advantageous Effects

According to the first mode of the data search apparatus relating to the present invention, the storage medium is provided which correlate the identification information of the data accumulation apparatuses functioning as the data provision side, and the identification information of the group to which the data accumulation apparatuses belong. Thereby, in the data search apparatus, when the data acquisition request is received from the terminal on the data acquisition side, the data accumulation apparatus belonging to the group designated by the data acquisition request is searched from the storage medium, and the accumulated data is collected from the searched data accumulation apparatus, and transmitted to the terminal of the source of the request. Thus, for example, by simply designating in the data acquisition request the group with respect to which the user wishes to collect data, the user on the data acquisition side can acquire batchwise the accumulated data of each data accumulation apparatus belonging to the group. Accordingly, the user does not need to perform an operation of acquiring data by individually accessing all data accumulation apparatuses which are data acquisition destinations. Thereby, the user can efficiently acquire the data of the acquisition target without fail.

Moreover, prior to the data search, the support information of the data search operation is transmitted from the data search apparatus to the terminal functioning as the data acquisition side, and the data acquisition request, which is transmitted from the terminal functioning as the data acquisition side in accordance with the support information, is received. Thus, even a user, who is unfamiliar with a data search operation, can execute, without an erroneous operation, the data search operation with the industry or the company/body being designated.

According to the second mode of the data search apparatus relating to the present invention, the storage table is provided which correlate the identification information of the edge servers, and the identification information of the organization to which the owner of the devices which transmit the data to the edge servers belong. Thereby, in the data search apparatus, when the data acquisition request including the identification information of the organization is received from the terminal on the data acquisition side, the edge server belonging to the organization designated by the data acquisition request is searched from the storage table, and the accumulated data is acquired from the searched edge server, and transmitted to the terminal of the source of the request. Thus, for example, by simply designating in the data acquisition request the organization, for instance, the industry name or the company/body name, with respect to which the user wishes to collect data, the user on the data acquisition side can acquire batchwise the accumulated data of all edge servers belonging to the designated industry or company/body. Accordingly, the user does not need to perform an operation of acquiring data by individually accessing all edge servers which are data acquisition destinations. Thereby, the user can efficiently acquire the data of the acquisition target without fail.

Moreover, also in the second mode, prior to the data search, the support information of the data search operation is transmitted from the data search apparatus to the terminal functioning as the data acquisition side, and the data acquisition request, which is transmitted from the terminal functioning as the data acquisition side in accordance with the support information, is received. Thus, even a user, who is unfamiliar with a data search operation, can execute, without an erroneous operation, the data search operation with the industry or the company/body being designated.

According to the third mode of the data search apparatus relating to the present invention, when the data search operation is supported, the menu screen information including the list of organizations which are candidates of the data acquisition target is transmitted, and the data acquisition request including the identification information of the organization selected from among the organizations included in the list is received. Thus, the user can designate the organization of the data acquisition target by simply selecting the desired organization from the list of organizations included in the menu screen. Therefore, the organization of the data search target can designated more easily and exactly.

According to the fourth mode of the data search apparatus relating to the present invention, when the organization includes a plurality of layers, the first menu information including the list of the layers of the organization is transmitted. When the first request including the identification information of the layer selected from the list of the layers included in the first menu information is received, the second menu information including the list of organizations included in the layer represented by the identification information of the layer included in the received first request is subsequently transmitted, and the second request including the identification information of the organization selected from the list of the organizations included in the second menu information is received. Thus, even when the organization is hierarchized into layers, the user can more exactly select and designate the organization of the desired layer by taking into account the layers of the organization.

According to the first mode of the edge server relating to the present invention, in the edge server, when the data acquisition request including the identification information of the organization is received from the terminal on the data acquisition side, the edge server belonging to the organization designated by the data acquisition request is searched from the storage table, and the accumulated data is acquired from the searched edge server, and transmitted to the terminal of the source of the request. Thus, for example, by simply transmitting to the specific edge server the data acquisition request designating the organization, for instance, the industry name or the company/body name, with respect to which the user wishes to collect data, the user on the data acquisition side can acquire batchwise the accumulated data of all edge servers belonging to the designated industry or company/body. Accordingly, the user does not need to perform an operation of acquiring data by individually accessing all edge servers which are data acquisition destinations. Thereby, the user can efficiently acquire the data of the acquisition target without fail.

Moreover, the support information of the data search operation is transmitted from the specific edge server to the terminal functioning as the data acquisition side, and the data acquisition request, which is transmitted from the terminal functioning as the data acquisition side in accordance with the support information, is received. Thus, even a user, who is unfamiliar with a data search operation, can execute, without an erroneous operation, the data search operation with the industry or the company/body being designated.

Specifically, according to each mode of the present invention, it is possible to provide a technology which can efficiently acquire, without fail, data of an acquisition target in a system using edge computing.

BRIEF DESCRIPTION OF THE DRAWINGS

FIG. 3 is a block diagram illustrating a functional configuration of the data search apparatus used in the data circulation system illustrated in FIG. 1.

FIG. 4 is a block diagram illustrating a functional configuration of a user terminal used in the data circulation system illustrated in FIG. 1.

FIG. 5 is a view illustrating an example of an industry information table which the data search apparatus illustrated in FIG. 3 manages.

FIG. 6 is a view illustrating an example of an industry relation information table which the data search apparatus illustrated in FIG. 3 manages.

FIG. 10 is a flowchart illustrating an example of a process procedure and process contents of a data search transmission process of the data search apparatus illustrated in FIG. 9.

FIG. 11 is a view illustrating an example of screen data displayed on the user terminal illustrated in FIG. 4.

DETAILED DESCRIPTION

Hereinafter, embodiments relating to the present invention will be described with reference to the accompanying drawings.

Figure 1:
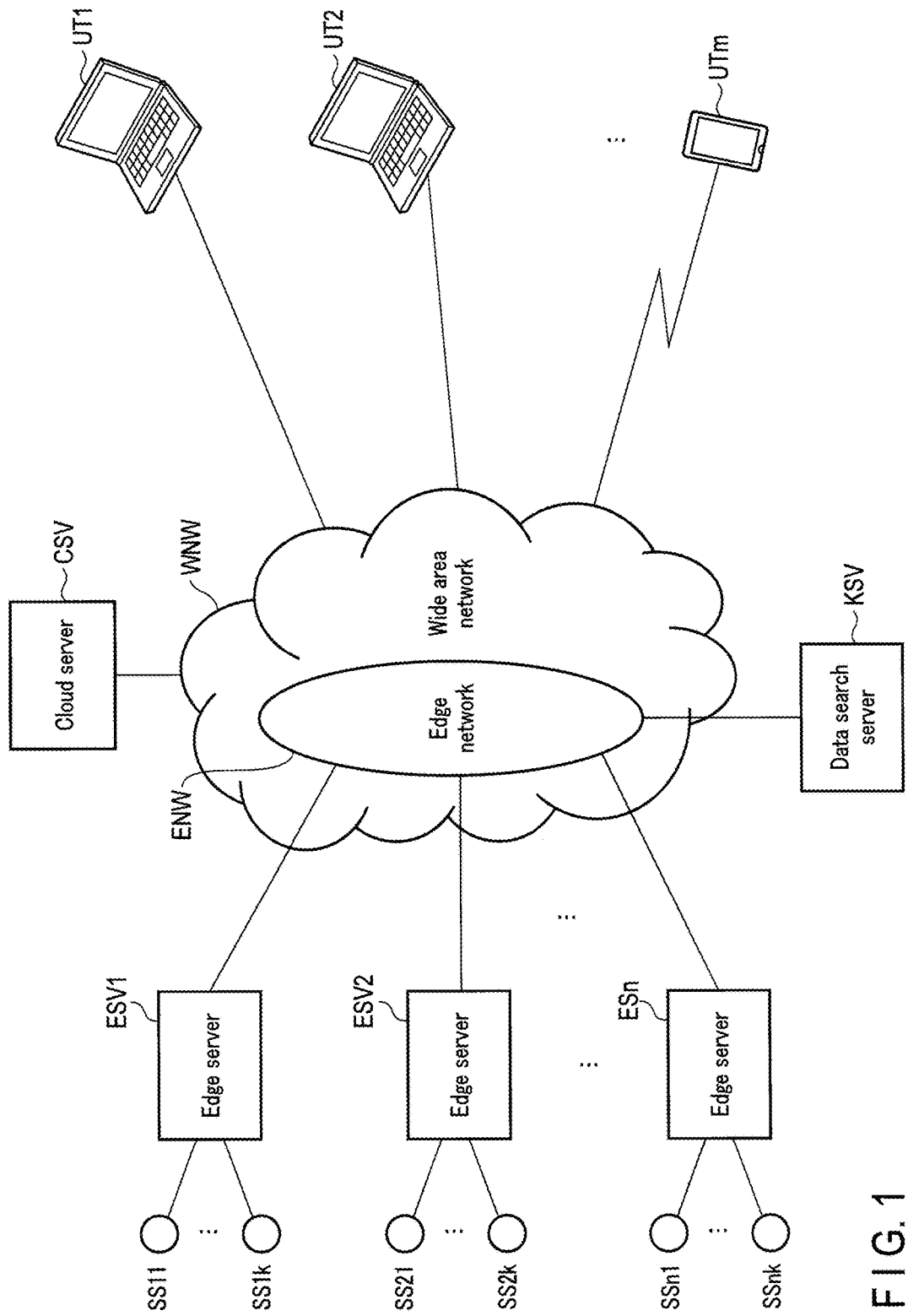
FIG. 1 is a diagram illustrating an entire configuration of a data circulation system including a data search apparatus according to one embodiment of the present invention.

One Embodiment (Configuration)
(1) System
FIG. 1 is a diagram illustrating an entire configuration of a data circulation system including a data search apparatus according to one embodiment of the present invention.

The data circulation system is configured such that edge servers ES1 to ESn functioning as data provision-side apparatuses, user terminals UT1 to UTm functioning as data acquisition-side apparatuses, and a cloud server CSV are connected via a wide area network WNW, and, furthermore, a data search server KSV functioning as a data search apparatus is provided.

The wide area network WNW includes, for example, a public network such as the Internet, and an access network for accessing the public network. The access network includes an edge network ENW which connects the edge servers ES1 to ESn. The edge network ENW is constructed by, for example, a LAN (Local Area Network) or a wireless LAN. Note that the edge servers ES1 to ESn may be configured to be connected to the Internet without intervention of the edge network ENW.

The edge servers ESV1 to ESVn are composed of, for example, server computers or gateways, and are disposed in respective monitoring targets which are, mainly, factories and business facilities managed by companies or bodies; hospitals; office buildings; commercial establishments; event/amusement facilities; animal and plant farming facilities; infrastructure facilities such as houses, roads, bridges, steel towers, and space facilities; and natural environments such as volcanoes, coasts, islands, mountains and fields. Note that the edge servers ESV1 to ESVn may be provided not only in the above-mentioned stationary infrastructure facilities, but may be provided in association with areas of movement of moving bodies such as vehicles, airplanes, drones and ships. In addition, the edge servers ESV1 to ESVn may be disposed in existing communication facilities, such as base stations of mobile communication systems, low-power-type small-sized base stations, integration stations, access points of wireless LAN or the like, and DSL (Digital Subscriber Line) boxes.

The edge servers ESV1 to ESVn are connected to a plurality of sensors SS11 to SS1$k$, SS21 to SS2$k$, ..., SSn1 to SSnk, respectively. The sensors SS11 to SS1$k$, SS21 to SS2$k$, ..., SSn1 to SSnk include, for example, equipment sensors which measure vibrations, strains and temperatures of equipment; environment sensors which measure temperatures, humidity, atmospheric pressure, wind velocity, dust concentration, and chemical substance concentration; monitoring sensors which detect positions, movements, numbers and the like of humans and animals by using cameras or the like; and biological sensors which measure body temperatures, blood pressure, pulsations, and the like of humans.

Sensing data measured or detected by the sensors SS11 to SS1$k$, SS21 to SS2$k$, ..., SSn1 to SSnk is transmitted to the edge servers ESV1 to ESVn which are preset as transmission destinations, via wireless interfaces which adopt low-power wireless data communication standards such as LAN, wireless LAN, Bluetooth (trademark) and the like. Note that the sensing data transmitted from the sensors SS11 to SS1$k$, SS21 to SS2$k$, ..., SSn1 to SSnk may be transmitted to the edge servers ESV1 to ESVn via access points, mobile terminals such as smartphones, or the like.

The cloud server CSV is composed of a cloud computer, and receives sensor data, which is transmitted from the edge servers ESV1 to ESVn, via the wide area network WNW, and accumulates the sensor data. In addition, when receiving a data acquisition request from the user terminal, UT1 to UTm, the cloud server CSV transmits the sensing data, which is indicated by the data acquisition request, to the user terminal, UT1 to UTm, which is the source of the request.

(2) Edge Server

Figure 2:
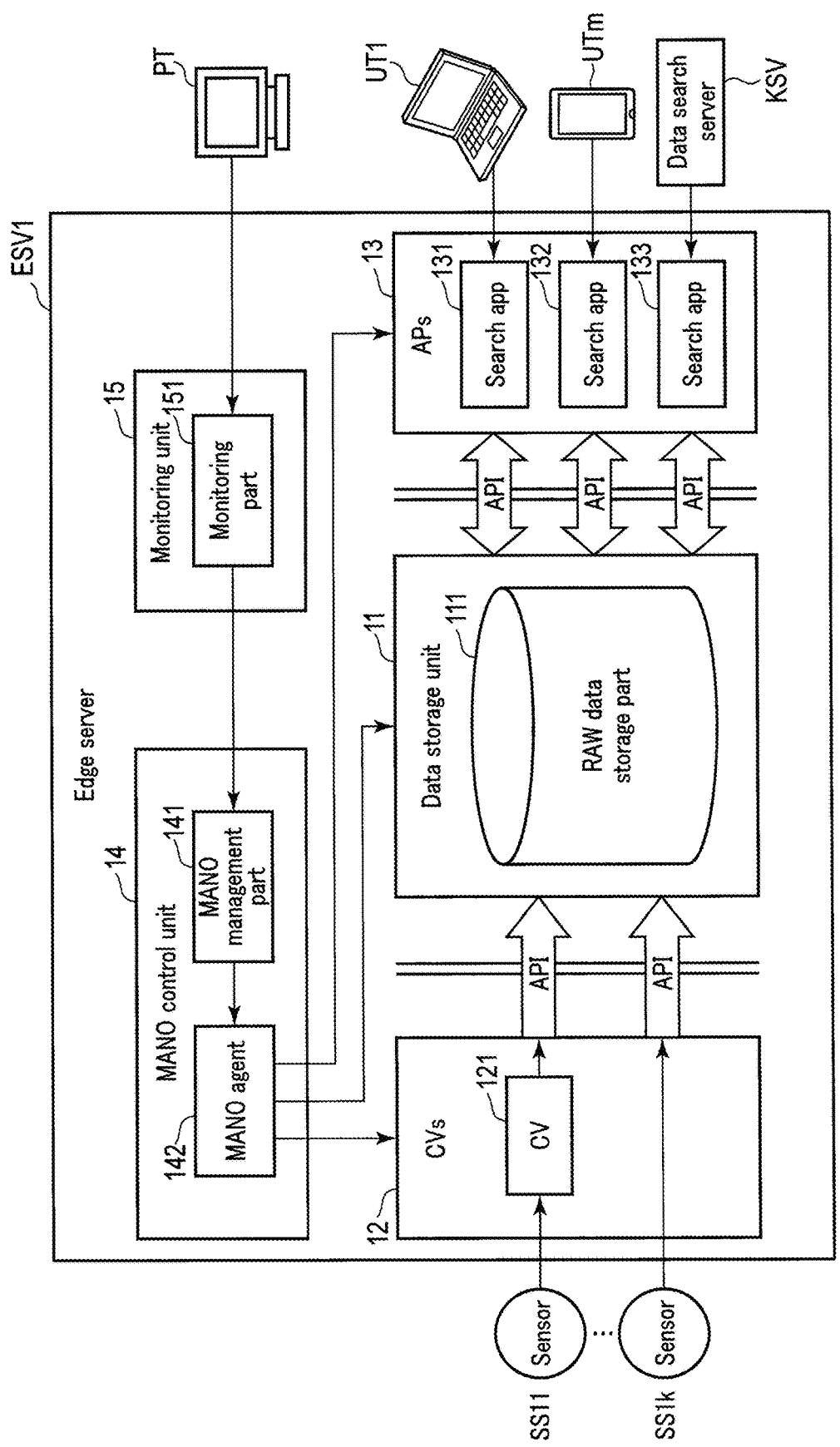
FIG. 2 is a block diagram illustrating a configuration of an edge server of the data circulation system illustrated in FIG. 1.

FIG. 2 is a block diagram illustrating an example of the configuration of the edge server, ESV1 to ESVn. Note that FIG. 3 representatively illustrates only the edge server ESV1, for the purpose of simpler illustration.

The edge server, ESV1 to ESVn, includes a data storage unit 11, converters (CVs) 12, applications (APs) 13, a control unit 14, and a monitoring unit 15.

The data storage unit 11 is composed as a storage medium by, for example, a nonvolatile memory capable of random write and read, such as an HDD (Hard Disk Drive) or an SSD (Solid State Drive). A RAW data storage part 111 is provided in the storage area, and the sensing data transmitted from the sensors SS11 to SS1$k$ is stored in the RAW data storage part 111.

The CVs 12 include a plurality of converters (CVs) 121. The converters 121 are provided in association with those of the sensors SS11 to SS1$k$, which require protocol conversion processing. The converters 121 convert the sensing data, which is received from the sensors SS11 to SS1$k$, to, for example, protocols suited to data circulation. The sensing data converted by the converters 121 is stored in the RAW data storage part 111 by APIs (Application Programming Interfaces). Note that a time stamp representative of a measurement date/time, and identification information (sensor IDs) of the sensors are imparted to the sensing data.

The APs 13 include a plurality of application programs for search (hereinafter referred to as "search apps") 131 to 133. Responding to data search requests from the user terminals UT1 and UTm and a data search server KSV (to be described later), the search apps 131 to 133 execute processes of reading the corresponding sensing data from the RAW data storage part 111 and transmitting the sensing data to the sources of the requests. At this time, identification information (hereinafter referred to as "edge ID") of the edge server ESV1 is imparted to the transmission data. Note that a data transfer process between the search apps 131 to 133 and the RAW data storage part 111 is also executed by the APIs.

The monitoring unit 15 is composed of monitoring middleware, and includes a monitoring part 151 functioning as a monitoring tool. The monitoring part 151 provides display screen data for operation management to an operation management terminal PT, receives instruction information for operation management, which is input in the operation management terminal PT, and supplies the instruction information to the control unit 14.

The control unit 14 includes a MANO (Management and Orchestration) management part 141 and a MANO agent 142. The MANO management part 141 and the MANO agent 142 are configured to execute an integral management/control/optimization process of network services and resources in the edge server ESV1, and manage respective software containers (programs) that are management targets in the edge server ESV1, based on the instruction information for operation management, which is supplied from the monitoring part 151.

(3) Data Search Server

FIG. 3 is a block diagram illustrating a functional configuration of the data search server KSV. The data search server KSV is operated by, for example, a network business operator, communication business operator or service operator that operates data circulation services. The data search server KSV is composed of a server computer or a personal computer.

The data search server KSV includes a control unit 21, a storage unit 22, and a communication interface unit 23. The communication interface unit 23 executes transmission of various data with the edge servers ESV1 to ESVn and the user terminals UT1 to UTm, according to communication protocols used in the edge network ENW and wide area network WNW. Note that the communication interface unit 23 is also used when data communication is executed with the cloud server CSV.

The storage unit 22 is composed as a storage medium by combining, for example, a nonvolatile memory capable of random write and read, such as an HDD (Hard Disk Drive) or an SSD (Solid State Drive), a nonvolatile memory such as a ROM (Read Only Memory), and a volatile memory such as a RAM (Random Access Memory). A program storage area and a data storage area are provided in the storage area of the storage unit 22. The program storage area stores necessary programs for executing various control processes relating to one embodiment of the present invention.

An industry information table 221 and an industry relation information table 222 are provided in the data storage area.

The industry information table 221 classifies the edge server ESV1 to ESVn into a plurality of groups, and stores identification information (edge IDs) of edge servers ESV1 to ESVn belonging to each group by correlating the identification information (edge IDs) of the edge servers ESV1 to ESVn with identification information (ID) of the group.

For example, as illustrated in FIG. 5, the identification information (edge IDs) of the edge servers ESV1 to ESVn, which are managed by a company/body, is stored by being correlated with identification information (company/body ID) of the company/body, and an industry ID for identifying an industry, which is an upper-level organization of the company/body, is also stored. Note that when one edge server is shared by a plurality of companies/bodies, or one company/body belongs to a plurality of industries, the ID of the edge server that is the target is stored in a manner to overlap the IDs of the companies/bodies or industries to which the edge server belongs. In addition, the industry information table 221 may additionally store information or the like of the address or latitude/longitude representing the positions of installation of the edge servers ESV1 to ESVn, and other attribute information.

The industry relation information table 222 defines information representing the relation between industries. For example, as illustrated in FIG. 6, the industry relation information table 222 correlates and stores an industry ID of an individual industry and an ID of another industry having a high degree of relation with the individual industry.

The control unit 21 includes, for example, a hardware processor such as a CPU (Central Processing Unit), and includes, as control functions for realizing one embodiment of the present invention, an edge attribute information acquisition part 211, a table management part 212 and a search mediation control part 213. These control functional parts are realized by causing the hardware processor to execute the programs stored in the program storage area of the storage unit 22.

The edge attribute information acquisition part 211 acquires attribute information relating to edge servers from the edge servers ESV1 to ESVn. The edge attribute information includes an edge ID, an ID of a company/body to which the edge server belongs, and an ID of an industry to which the company/body belongs. Note that the attribute information may include other information such as information or the like of the positions of installation of the edge servers ESV1 to ESVn.

The table management part 212 executes a process of newly generating and updating the industry information table 221 and industry relation information table 222, based on the attribute information of edge servers acquired by the edge attribute information acquisition part 211.

The search mediation control part 213 includes a menu screen provision part 2131, a data acquisition request acquisition part 2132, and a data search report part 2133. Of these, the menu screen provision part 2131 and data acquisition request acquisition part 2132 include functions as a data search operation support part.

The menu screen provision part 2131 executes a process of reading out, in response to an access request from the user terminal, UT1 to UTm, various operation menu screen information for supporting the user's data search operation, from a template storage part (not illustrated) of the storage unit 22, and transmitting the various operation menu screen information to the user terminal, UT1 to UTm, which is the source of the request. An example of the operation menu screen information will be described later.

The data acquisition request acquisition part 2132 executes a process of receiving a data acquisition request which is transmitted from the user terminal, UT1 to Utm, after transmitting the operation menu screen information, and extracting identification information (e.g. industry ID, company/body ID, edge ID) of the acquisition target included in the data acquisition request.

The data search report unit 2133 includes the following processing functions.

(1) A function of executing a process of searching, when an industry ID is included in the data acquisition request transmitted from the user terminal, UT1 to UTm, a correlated edge ID from the industry information table 221; and accessing a corresponding edge server, based on the searched edge ID, and collecting sensing data from the edge server.

(2) A function of executing a process of generating list information indicative of a relation between the industry ID included in the data acquisition request, and the company/body ID and edge ID searched from the industry information table 221; and generating report data edited by linking the acquired sensing data to the generated list information, and transmitting the report data to the user terminal, UT1 to UTm, which is the source of the data acquisition request.

(3) A function of executing a process of referring to the industry relation information table 222, based on the industry ID included in the data acquisition request, and deciding on the presence/absence of another industry having a high degree of relation with the industry of the industry ID; and, if the result of the decision indicates the presence of another industry having a high degree of relation, generating relation list information representative of the relation between an ID of the another industry, an ID of the company/body belonging to this industry, and an ID of the edge server operated by the company/body, and transmitting the relation list information to the user terminal, UT1 to UTm, which is the source of the data acquisition request.

(4) A function of executing a process of accessing, when an additional acquisition request designating the edge ID included in the transmitted relation list information is transmitted from the user terminal, UT1 to UTm, an edge server corresponding to the edge ID included in the additional acquisition request, acquiring sensing data, and transmitting the sensing data to the user terminal, UT1 to UTm, which is the source of the request.

(4) User Terminal

The user terminals UT1 to UTm are used by, for example, service business operators or the like that acquire and analyze sensing data, and are composed of a personal computer, a smartphone, a tablet terminal, and the like.

FIG. 4 is a block diagram illustrating a functional configuration of the user terminal UT1. Note that FIG. 4 representatively illustrates only the configuration of the user terminal UT1, for the purpose of simpler illustration.

The user terminal UT1 includes a control unit 31, a storage unit 32, a communication interface unit 33 with an antenna 331, and an input/output interface unit 34.

The communication interface unit 33 is connected to the wide area network WNW via a wireless network, and executes communication for acquiring data with the data search server KSV and cloud server CSV.

The storage unit 32 is composed as a storage medium by combining, for example, a nonvolatile memory capable of random write and read, such as an HDD (Hard Disk Drive) or an SSD (Solid State Drive), a nonvolatile memory such as a ROM (Read Only Memory), and a volatile memory such as a RAM (Random Access Memory). A program storage area and a data storage area are provided in the storage area of the storage unit 32. The program storage area stores necessary programs for executing various control processes relating to one embodiment of the present invention.

The data storage area includes a report data storage part 321 and an analysis data storage part 322. The report data storage part 321 is used to store report data received from the data search server KSV. The analysis data storage unit 322 is used to store data representative of a result of a predetermined data analysis process which is executed based on the report data.

An input unit 35 and a display unit 36 are connected to the input/output interface unit 34. The input unit 35 is composed of, for example, a keyboard or a touch panel, and is used to input various operation information. The display unit 36 is composed of, for example, a display using a liquid crystal or organic EL. The input/output interface unit 34 outputs various operation information, which is input in the input unit 35, to the control unit 31, and causes the display unit 36 to display the display information that is output from the control unit 31.

The control unit 31 includes, for example, a hardware processor such as a CPU (Central Processing Unit), and includes, as control functions, a menu reception display control part 311, a report data reception display control part 312, and a data analysis display control part 313. These control functional parts are realized by causing the hardware processor to execute the programs stored in the program storage area of the storage unit 32.

The menu reception display control part 311 executes a process of receiving, via the communication interface unit 33, various menu screen information which is transmitted from the data search server KSV in the process of the data search operation, outputting the various menu screen information to the input/output interface unit 34, and causing the display unit 36 to display the menu screen information.

The report data reception display control part 312 executes a process of receiving, via the communication interface unit 33, report data which is transmitted from the data search server KSV, causing the report data storage part 321 to store the received report data, outputting the report data to the input/output interface unit 34, and causing the display unit 36 to display the report data.

The data analysis display control part 313 executes a process of executing, based on the report data stored in the report data storage part 321, a data analysis process corresponding to a purpose of analysis with respect to sensing data included in the report data by using, for example, a learning model, and causing the analysis data storage part 322 to store data representative of the result of the analysis.

Examples of the data analysis process include an example in which, in a real estate industry or a hotel industry, the occurrence of empty rooms on a region-by-region basis is estimated from the history of use of each office building or hotel; an example in which, in an automobile industry, the demand for parts is estimated from the state of progress of production in each factory; and an example in which, in a transport industry, optimal delivery routes based on prediction of faults of vehicles and estimation results of traffic jams or weather on a region-by-region basis are estimated based on the sensing data collected from vehicles which are running.

(Operation)

Next, an operation by the data search server KSV with the above-described configuration will be described.

Figure 7:
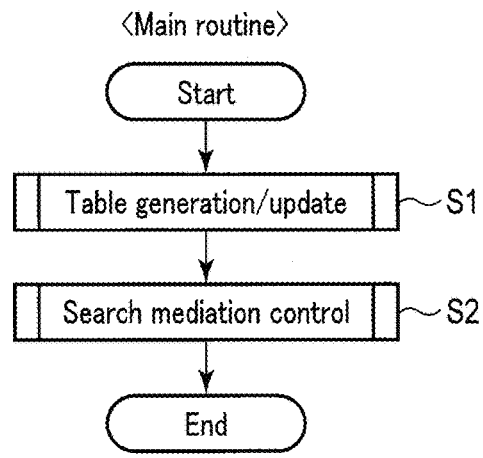
FIG. 7 is a flowchart illustrating a process procedure and process contents of a main routine which is executed in the data search apparatus illustrated in FIG. 3.

FIG. 7 is a flowchart illustrating an outline (main routine) of a process procedure of the data search server KSV.

To start with, in step S1, under the control of the control unit 21, the data search server KSV executes a process of generating or updating the industry information table 221 and industry relation information table 222. Then, in the next step S2, the data search server KSV executes search mediation control of data.

(1) Table Generation/Update Process

Figure 8:
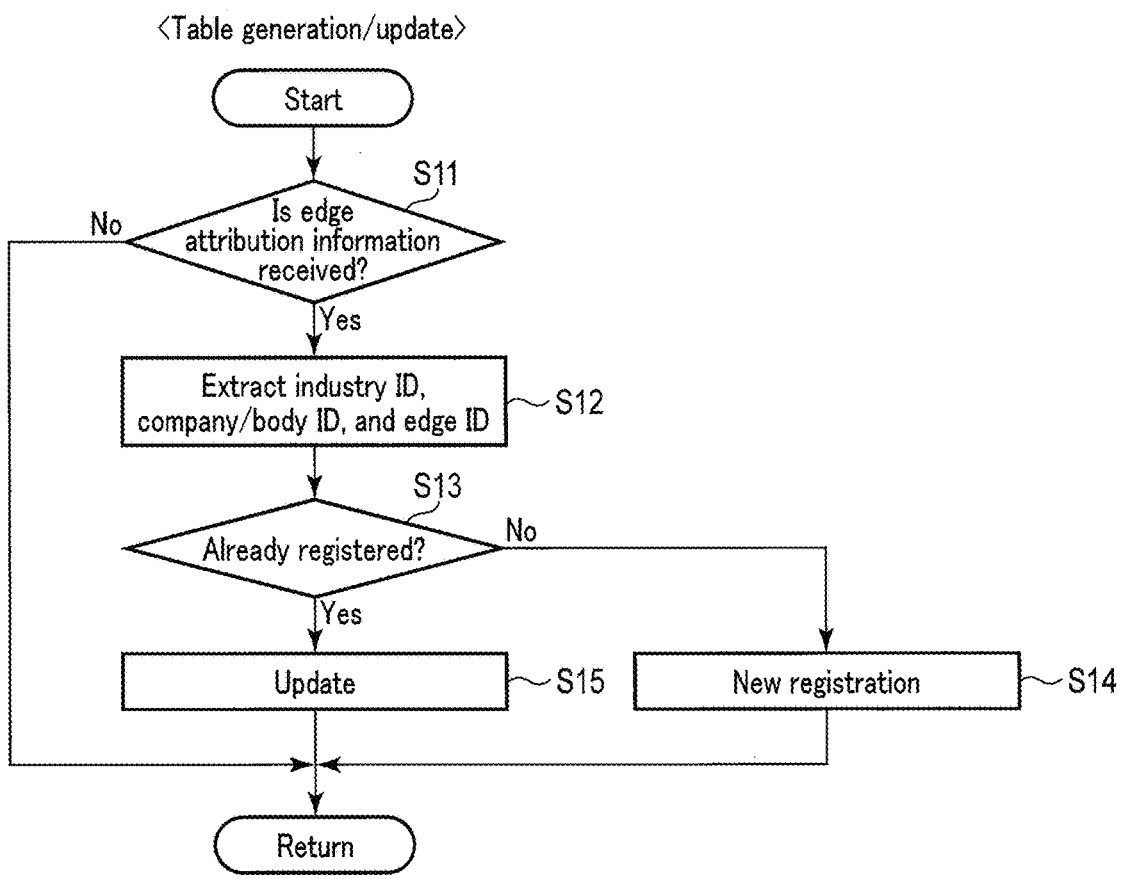
FIG. 8 is a flowchart illustrating a process procedure and process contents of a table generation/update control which is executed in the data search apparatus illustrated in FIG. 3.

FIG. 8 is a flowchart illustrating a process procedure and process contents of the table generation/update control process by the control unit 21 of the data search server KSV.

(1-1) Initial Registration of Industry Information in Table

In step S11, under the control of the edge attribute information acquisition part 211, the control unit 21 of the data search server KSV first acquires edge attribute information from the edge servers ESV1 to ESVn before starting the operation of the apparatus. Then, in step S12, under the control of the table management part 212, the control unit 21 extracts, from the acquired edge attribute information, the edge ID, the ID of the company/body to which the edge server belongs, and the ID of the industry to which the company/body belongs, and decides whether the IDs are already registered in the industry information table 221. If the result of the decision indicates the non-registration, the control unit 21 newly registers the IDs acquired in step S14 in the industry information table 221.

The control unit 21 of the data search server KSV successively executes the above new registration process for all the edge servers ESV1 to ESVn, and generates the industry information table 221, for example, as illustrated in FIG. 4. Note that the industry relation information 222 is generated, for example, by a manual operation by an administrator.

(1-2) Update of Table

In step S11, after the start of the operation of the apparatus, the control unit 21 of the data search server KSV periodically acquires the edge attribute information from all the edge severs ESV1 to ESVn under the control of the edge attribute information acquisition unit 211. Then, in step S12, under the control of the table management part 212, the control unit 21 extracts, from the acquired edge attribute information, the edge ID, the ID of the company/body to which the edge server belongs, and the ID of the industry to which the company/body belongs, and decides whether the IDs are already registered in the industry information table 221. If the result of the decision indicates that the industry ID is registered but the edge ID is not registered, the control unit 21 additionally registers, in step S15, the acquired edge ID in the industry information table 221. In other words, the control unit 21 updates the industry information table 221.

(2) Data Search Mediation Control

Figure 9:
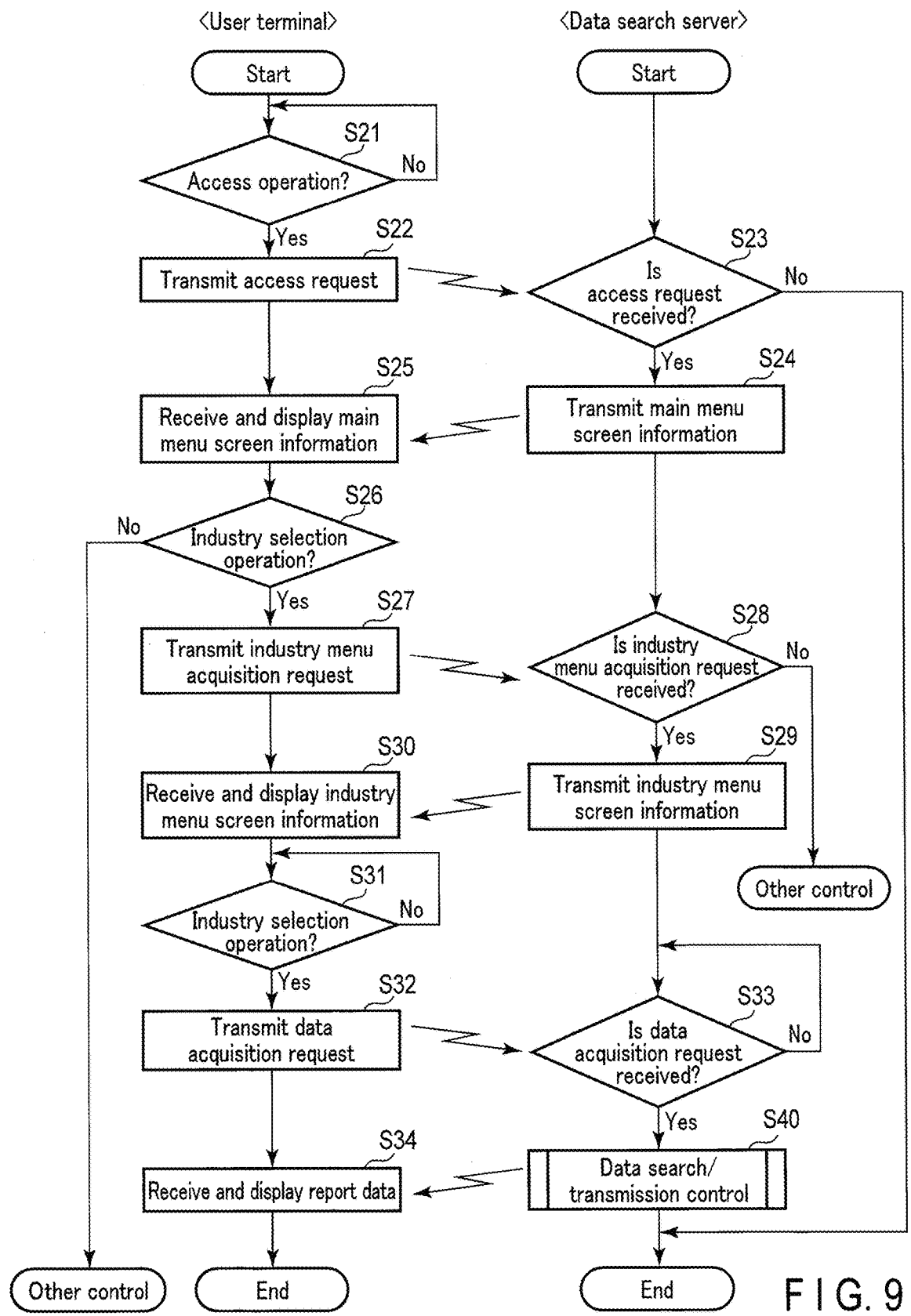
FIG. 9 is a flowchart illustrating a process procedure and process contents relating to a data search by the data search apparatus and the user terminal illustrated in FIG. 3 and FIG. 4.

FIG. 9 is a flowchart illustrating a process procedure and process contents in the data search server KSV and the user terminal UT1.

(2-1) Support for Data Search Operation

It is assumed that, in the user terminal UT1, the user first executed an access operation to the data search server KSV in order to acquire sensing data relating to a desired industry. Then, the control unit 31 of the user terminal UT1 executes the following process under the control of the menu reception display control part 311.

Specifically, to start with, upon detecting the above-described access operation in step S21, the menu reception display control part 311 transmits, in step S22, an access request from the communication interface unit 33 to the data search server KSV.

On the other hand, upon detecting the reception of the access request in step S23, the control unit 21 of the data search server KSV reads out, under the control of the menu screen provision part 2131, main menu screen information from the template storage part of the storage unit 32 in step S24, and transmits the main menu screen information from the communication interface unit 23 to the user terminal UT1 that is the source of the request.

The menu screen information includes a menu for prompting selection between "organization" and "edge" as a search target candidate. In this case, when the "organization" is hierarchized into "industry" and "company/body", the menu screen information includes a menu for prompting selection among "industry", "company/body" and "edge".

In step S25, under the control of the menu reception display control part 311, the user terminal UT1 receives the main menu screen information and causes the display unit 36 to display the main menu screen information via the input/output interface unit 34. As a result, for example, as illustrated in part (a) of FIG. 11, the "industry", "company/body" and "edge" are displayed on the user terminal UT1 as a menu of search target candidates.

It is assumed that in the state in which the above-described main menu screen is displayed, the user has selected, for example, the "industry", as illustrated in part (a) of FIG. 11. If the menu reception display control part 311 of the user terminal UT1 detects that the "industry" is selected in step S26, the menu reception display control part 311 transmits, in step S27, an acquisition request for an industry menu from the communication interface unit 33 to the data search server KSV.

On the other hand, upon detecting the reception of the industry menu acquisition request in step S28, the control unit 21 of the data search server KSV reads out, under the control of the menu screen provision part 2131, menu information of the industry from the template storage part of the storage unit 22 in step S29, and transmits the menu screen information of the industry from the communication interface unit 23 to the user terminal UT1 that is the source of the request.

In step S30, under the control of the menu reception display control part 311, the user terminal UT1 receives the industry menu screen information and causes the display unit 36 to display the industry menu screen information via the input/output interface unit 34. As a result, for example, as the industry menu screen information, as illustrated in part (b) of FIG. 11, the industry menu screen information indicating the industry names of "automobile", "manufacturing apparatus", "construction" and "medical service" is displayed on the display unit 36.

Subsequently, it is assumed that the user has selected a desired industry, for example, the "manufacturing apparatus" on the displayed industry menu screen, as illustrated in part (b) of FIG. 11. Then, upon detecting a selection operation of the industry in step S31 under the control of the menu reception display control part 311, the user terminal UT1 transmits, in step S32, a data acquisition request including the ID of the selected industry from the communication interface unit 33 to the data search server KSV.

Note that in the user terminal UT1, when the "company/body" is selected in place of the "industry", the data search server KSV transmits menu screen information including, for example, a list of "companies/bodies" to the user terminal UT1. Then, if a desired company/body in the list of the company/body menu is selected, a data acquisition request including the identification information of the selected company/body is transmitted from the user terminal UT1 to the data search server KSV.

In addition, in the user terminal UT1, when the "edge" is selected, the data search server KSV transmits menu screen information including a list of the edge servers ESV1 to ESVn to the user terminal UT1. Then, if a desired edge server in the menu list of the edge servers is selected, a data acquisition request including the identification information of the selected edge server is transmitted from the user terminal UT1 to the data search server KSV.

(2-2) Data Search/Transmission Control

On the other hand, upon detecting the reception of the data acquisition request in step S33 under the data acquisition request acquisition part 2132, the data search server KSV subsequently executes in step S40 a search/transmission control of sensing data under the control of the data search report part 2133, as will be described below.

FIG. 10 is a flowchart illustrating an example of a process procedure and process contents by the data search report part 2133 of the data search server KSV.

(2-2-1) Batch Search of Edge Server Data Belonging to Industry

Upon detecting the reception of the data acquisition request from the user terminal UT1 under the control of the data search report part 2133, the control unit 21 of the data search server KSV first extracts the ID of the data search target from the data acquisition request in step S41. Then, the control unit 21 decides which of the "industry", "company/body" and "edge server" relates to the extracted ID.

As a result of the decision, if the ID indicates, for example, the "industry", the data search report part 2133 searches, in step S42, the ID of the company/body and the edge IDs of the edge servers ESV, which are correlated with the extracted industry ID, from the industry information table 221.

Subsequently, in step S43, the data search report part 2133 successively accesses, via the edge network ENW, the corresponding edge servers ESV, based on the searched edge IDs, and acquires sensing data from each edge server in step S44.

The data search report part 2133 generates, in the next step S45, list information indicative of the relation between the industry ID included in the data acquisition request, the company/body ID and edge ID searched from the industry information table 221. Then, the data search report part 2133 generates report data by linking the acquired sensing data to the generated list information, and transmits the report data from the communication interface unit 23 to the user terminal, UT1 to UTm, which is the source of the acquisition request.

For example, if it is assumed that the user designates the industry "A" as the data search target, "a1", "a2" and "a3" are searched as the IDs of the "company/body", and "Ea11", "Ea11", "Ea21", "Ea31" and "Ea32" are searched as the edge IDs, based on the industry information table 221 illustrated in FIG. 5. Then, sensing data is acquired from the corresponding edge servers, based on the edge IDs "Ea11", "Ea11", "Ea21", "Ea31" and "Ea32".

In conjunction with this, list information is generated which indicates, for example, in a tree form, the relation with the searched company/body IDs "a1", "a2" and "a3" and edge IDs "Ea11", "Ea11", "Ea21", "Ea31" and "Ea32", which belong to the industry ID "A". In addition, report data is generated by linking each ID of the list information to the acquired corresponding sensing data, and the report data is transmitted to the user terminal of the source of the request.

For example, it is assumed that the "manufacturing apparatus" industry has been selected as the industry, as exemplarily illustrated in part (b) of FIG. 11. In this case, list information is generated which indicates in a tree form the relation between the company/body belonging to the "manufacturing apparatus" industry, and factories in which the edge servers operated and managed by the company/body are installed. Part (c) of FIG. 11 illustrates an example of the list information at this time. Further, each factory in the list information is linked to the sensing data collected from the edge server of the factory.

In step S34, the user terminal UT1 receives the report data via the communication interface unit 33 under the control of the report data reception display control part 312. In addition, the user terminal UT1 causes the report data storage part 321 in the storage unit 32 to store the received report data, and causes the display unit 36 to display the report data via the input/output interface 34. As a result, the list information is first displayed on the display unit 36, and if the user selects a desired factory in the list information, the sensing data linked to this factory is read out from the report data storage part 321 and displayed on the display unit. Accordingly, the user can confirm the waveforms and numerical values of the sensing data.

In addition, under the control of the data analysis display control part 313, the user terminal UT1 reads out all or part of the sensing data included in the report data, executes an analysis process according to a predetermined analysis rule, and causes the analysis data storage part 322 to store the result of the analysis process. The stored analysis data can be read out, for example, in accordance with the user's operation, and can be displayed on the display unit 36 via the input/output interface unit 34. In addition, the analysis data can be transmitted, for example, from the communication interface unit 33 to each company/body or each factory.

(2-2-2) Data Search Process in Case where "Company/Body" or "Edge Server" is Selected in Place of "Industry"

When the ID extracted from the data acquisition request is indicative of, for example, the "company/body", the data search report part 2133 searches, in step S42, the edge IDs, which are correlated with the extracted company/body ID, from the industry information table 221. Then, in step S43, the data search report part 2133 successively accesses, via the edge network ENW, the corresponding edge servers ESV, based on the searched edge IDs, and acquires sensing data from each edge server in step S44.

In conjunction with this, the data search report part 2133 generates, in step S45, list information indicative of the relation between the company/body ID included in the data acquisition request, and the subordinated edge IDs searched from the industry information table 221. Then, the data search report part 2133 generates report data by linking the acquired sensing data to the generated list information, and transmits the report data from the communication interface unit 23 to the user terminal UT1, which is the source of the acquisition request.

Note that when the ID of the "edge" is selected in the user terminal UT1, each corresponding edge server ESV is accessed via the edge network ENW, based on the ID of the "edge", and sensing data is acquired from the edge server in step S44.

(2-2-3) Provision of Related Industry List and Search of Edge Server Data Thereof When the industry ID is included in the data acquisition request that is sent from the user terminal UT1, the data search report part 2133 of the data search server KSV, in step S46 in FIG. 10, refers to the industry relation information table 222, based on the industry ID included in the data acquisition request, and decides on the presence/absence of another industry with a high degree of relation with the industry in step S47. If the result of the decision indicates the presence of another industry having a high degree of relation, the data search report part 2133 generates, in step S48, relation list information representative of the relation between the ID of the another industry, the ID of the company/body belonging to this industry, and the IDs of the edge servers operated by the company/body, and transmitting the relation list information to the user terminal UT1 which is the source of the data acquisition request.

For example, according to the industry relation information table 222 illustrated in FIG. 6, industries "C" and "D" are searched as other industries having high degrees of relation with the industry "A" designated by the user. In addition, based on the industry information table 221, relation list information is generated which represents the relation between the IDs "C" and "D" of the other industries, the IDs of the companies/bodies belonging to the industries, and the IDs of the edge servers operated by the companies/bodies, and the relation list information is transmitted to the user terminal of the source of the request.

In the example of FIG. 11, since the "manufacturing apparatus" industry and the "automobile" industry have a close relation, the "automobile" industry is selected as the related industry, and relation list information is generated which represents, in a tree form, the relation between the companies/bodies belonging to the "automobile" industry and the subordinated factories thereof, and the relation list information is transmitted to the user terminal of the source of the request.

The relation list information, which is transmitted from the data search server KSV, is displayed on the display unit of the user terminal. In this state, if the user executes a selection operation on a freely chosen edge ID in the relation list information, an additional acquisition request including this edge ID is transmitted from the user terminal to the data search server KSV.

Upon receiving the additional acquisition request, the data search server KSV accesses the corresponding edge server, based on the edge ID included in the additional acquisition request, and acquires sensing data from the edge server. Then, the acquired sensing data is transmitted to the user terminal UT1 of the source of the request.

Advantageous Effects

As has been described above in detail, in one embodiment, the industry information table 221 is provided which stores the edge IDs of edge servers ESV1 to ESVn operated and managed by the company/body, by correlating the edge IDs with the industry ID which identifies the industry, and the ID of the company/body belonging to the industry. In addition, when the data acquisition request designating the industry ID is received from the user terminal, UT1 to UTm, the edge servers correlated with the designated industry ID are searched from the industry information table 221, and sensing data is acquired from each of the searched servers and transmitted to the user terminal, UT1 to UTm, which is the source of the request.

Accordingly, by simply designating the ID of the industry with respect to which the user wishes to collect data, the user can acquire batchwise, without fail, the sensing data from all edge servers operated and managed by each company/body belonging to the industry. Thereby, the time and labor needed for data acquisition by the user can greatly be reduced.

In addition, when the user executes the data acquisition operation, the menu screen information is sent from the data search server KSV to the user terminal, UT1 to UTm, and displayed, and the data acquisition request including the industry ID or company/body ID selected on the menu screen by the user is transmitted from the user terminal, UT1 to UTm, to the data search server KSV. Thus, even a user, who is unfamiliar with a data search operation, can execute, without an erroneous operation, the data search operation with the industry or the company/body being designated.

Besides, in one embodiment, when transmitting the sensing data, the data search server KSV generates the list information indicative of the relation between the industry ID, the company/body ID and each edge ID, and transmitting the sensing data by linking the edge ID of the list to the corresponding sensing data. Thus, the user can clearly recognize by which edge server the received sensing data is collected, and by which company/body the edge server is operated and managed.

In addition, the data search server KSV searches, from the industry relation information table 222, another industry having a high degree of relation with the industry designated by the user, generates the relation list information representative of the relation between the ID of the searched other industry, the ID of the company/body belonging to the industry, and the ID of the edge server operated and managed by the company/body, and transmits the relation list information to the user terminal of the source of the request. Moreover, when the additional acquisition request including the edge ID, which is included in the relation list information, is received from the user terminal, the sensing data of the edge server corresponding to the edge ID is acquired and transmitted to the user terminal of the source of the request.

Accordingly, the user can know, based on the relation list information, the presence/absence of another industry having a high degree of relation, and a company/body belonging to the another industry, and edge servers of the company/body. In addition, by designating a desired edge ID, based on the relation list information, and transmitting an additional acquisition request to the data search server KSV, the user can additionally acquire sensing data of the desired edge server.

Additionally, since the edge servers ESV1 to ESVn are connected via the local edge network ENW, and the data search server KSV is connected to the edge network ENW, the collection of sensing data from the edge servers ESV1 to ESVn by the data search server KSV can be performed without intervention of the wide area network WNW such as the Internet. As a result, the collection process of sensing data can be executed in a short time without undergoing the influence of traffic of the wide area network WNW or the influence of the transmission band of the access path. Besides, there is no concern of an increase in traffic of the wide area network WNW.

Additionally, by the data search server KSV, the edge attribute information is acquired from the edge servers ESV1 to ESVn, and the industry information table 221 is generated and updated based on the edge attribute information. Thus, the industry information table 221 can be automatically generated, and, when an edge server is added, changed or deleted during operation, the industry information table 221 can be automatically updated accordingly.

Other Embodiments

In the above-described one embodiment, the example was described in which the data search server KSV is provided independently from the edge servers ESV1 to ESVn and the cloud server CSV. However, aside from this, the function of the data search server may be provided in any one of the edge servers ESV1 to ESVn or in the cloud server CSV, or may be provided in the terminal or server which the user uses.

In the above-described one embodiment, the example was described in which the organization is hierarchized into two layers of "industry" and "company/body". However, aside from this, the organization may be hierarchized into, for example, three or more layers, such as "industry", "company/body", "business facility" and "branch office", and the user may be prompted to select a desired layer from among these layers.

Furthermore, in the above-described one embodiment, the example was described in which the menu screen information including the list of a plurality of organizations, which are candidates of data acquisition targets, is transmitted as data search support information, and the data acquisition request including identification information of an organization selected from among the organizations included in the list is received. However, the present invention is not limited to this. Without using the screen data as the data search support information, for example, menu information represented by text data or the like may be transmitted, an application program of the user terminal may convert the menu information to an audio menu by using, for example, a speech synthesis technology, and may amplify and output the audio menu, and the user may listen to the audio menu and voice-input a desired organization. Besides, the text data of the menu information may be decoded by an application program of the user terminal, and an organization may be designated in advance by the user or may be automatically selected based on a past designation history.

Besides, the configuration of the data search apparatus, the process procedure and process content of the data search apparatus, the configuration of the industry information table, the configuration of the edge server, and the kinds and numbers of sensors and sensing data, may be various modified and implemented without departing from the spirit of the present invention.

In short, the present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

REFERENCE SIGNS LIST

SS11 to SSnk . . . Sensors
ESV1 to ESVn . . . Edge servers
CSV . . . Cloud server
UT1 to UTm . . . User terminals
WNW . . . Wide area network
ENW . . . Edge network
KSV . . . Data search server
PT . . . Operation management terminal
11 . . . Data storage unit
12 . . . Converters (CVs)
13 . . . Applications (APs)
14 . . . Control unit
15 . . . Monitoring unit
21 . . . Control unit of data search server
22 . . . Storage unit of data search server
23 . . . Communication interface unit of data search server
31 . . . Control unit of user terminal
32 . . . Storage unit of user terminal
33 . . . Communication interface unit of user terminal
34 . . . Input/output interface unit of user terminal
35 . . . Input unit
36 . . . Display unit
111 . . . RAW data storage part
121 . . . Converter (CV)
131 to 133 . . . Search apps 141 . . . MANO management part
142 . . . MANO agent
211 . . . Edge attribute information acquisition part
212 . . . Table management part
213 . . . Search mediation control part
221 . . . Industry information table
222 . . . Industry relation information table
311 . . . Menu reception display control part
312 . . . Report data reception display control part
321 . . . Report data storage part
322 . . . Analysis data storage part
2121 . . . Menu screen provision part
2132 . . . Data acquisition request acquisition part
2133 . . . Data search report part

The invention claimed is:

1. A data search apparatus connectable via a network to a plurality of edge servers functioning as a data provision side and to a terminal functioning as a data acquisition side, the edge servers being configured to receive and accumulate data transmitted from a plurality of devices, the data search apparatus comprising:
a storage table configured to correlate and store information which identifies the edge servers, and information which identifies an organization to which an owner of the devices which transmit the data to the edge servers belongs;
a data search operation support part configured to transmit support information of a data search operation to the terminal functioning as the data acquisition side, and to receive a data acquisition request including identification information of an organization that is a data acquisition target, the data acquisition request being transmitted from the terminal functioning as the data acquisition side in accordance with the support information;
an edge server search part configured to search, when receiving a data acquisition request including the identification information of the organization from the terminal functioning as the data acquisition side, identification information of an edge server, which is correlated with the identification information of the organization included in the data acquisition request, from the storage table;
a data collection part configured to collect, based on the searched identification information of the edge server, the accumulated data from the corresponding edge server; and
a data transmission part configured to transmit via the network the collected data to the terminal which is a transmission source of the data acquisition request.

2. The data search apparatus of claim 1, wherein the data search operation support part is configured to transmit menu screen information including a list of a plurality of organizations which are candidates of a data acquisition target, and to receive a data acquisition request including identification information of an organization selected from among the organizations included in the list.

3. The data search apparatus of claim 1, wherein the data search operation support part includes:
a first support processing part configured to transmit, when the organization includes a plurality of layers, first menu information including a list of the layers of the organization, and to receive a first request including identification information of a layer selected from the list of the layers included in the first menu information; and
a second support processing part configured to transmit second menu information including a list of a plurality of organizations included in a layer represented by the identification information of the layer included in the received first request, and to receive a second request including identification information of an organization selected from the list of the organizations included in the second menu information.

4. The data search apparatus of claim 3, wherein:
the organization includes an organization of a first layer and an organization of a second layer, the first layer includes a plurality of owners of the plurality of devices, and the second layer includes a plurality of the organizations of the first layer;
the storage table is further configured to correlate and store information which identifies the organization of the second layer including the plurality of the organizations of the first layer, and information which identifies the organization of the first layer;
the first menu information transmitted by the first support processing part of the data search operation support part includes a list of the plurality of layers including the first and second layers; and
the second support processing part of the data search operation support part configured to transmit, when the identification information of the second layer includes the received first request, a second menu information including a list of a plurality of the organizations of the first layer included in the second layer represented by the identification information of the second layer, and to receive a second request including identification information of the organization of the first layer selected from the list of the plurality of the organizations of the first layer included in the second menu information.

5. The data search apparatus of claim 1, wherein:
the organization includes an organization of a first layer and an organization of a second layer, the first layer includes a plurality of owners of the plurality of devices, and the second layer includes a plurality of the organizations of the first layer; and
the storage table is further configured to correlate and store information which identifies the organization of the second layer including the plurality of the organizations of the first layer, and information which identifies the organization of the first layer.

6. The data search apparatus of claim 5, wherein the organization of the first layer includes a company or a body and the organization of the second layer includes an industry.

7. An edge server which is a specific edge server of a plurality of edge servers capable of receiving and accumulating data transmitted from a plurality of devices and capable of executing data transmission among the edge servers, the edge server comprising:
a storage table configured to correlate and store information which identifies the edge servers, and information which identifies an organization to which an owner of the devices which transmit the data to the edge servers belongs;
a data search operation support part configured to transmit support information of a data search operation to a terminal functioning as a data acquisition side, and to receive a data acquisition request including identification information of an organization that is a data acquisition target, the data acquisition request being transmitted from the terminal functioning as the data acquisition side in accordance with the support information;
an edge server search part configured to search, from the storage table, identification information of an edge server which is correlated with the identification information of the organization included in the received data acquisition request;
a data collection part configured to collect, based on the searched identification information of the edge server, the accumulated data from the corresponding edge server; and
a data transmission part configured to transmit via a network the collected data to the terminal which is a transmission source of the data acquisition request.

8. A non-transitory computer readable medium storing a program causing a computer to execute a data search method, the computer being included in a data search apparatus connectable via a network to a plurality of edge servers functioning as a data provision side and to a terminal functioning as a data acquisition side, the edge servers being configured to receive and accumulate data transmitted form a plurality of devices, the data search method comprising:
correlating, and storing in a storage table, information which identifies the edge servers, and information which identifies an organization to which an owner of the devices which transmit the data to the edge servers belongs;
transmitting support information of a data search operation to the terminal functioning as the data acquisition side, and receiving a data acquisition request including identification information of an organization that is a data acquisition target, the data acquisition request being transmitted from the terminal functioning as the data acquisition side in accordance with the support information;
searching, when receiving a data acquisition request including the identification information of the organization from the terminal functioning as the data acquisition side, identification information of an edge server, which is correlated with the identification information of the organization included in the data acquisition request, from the storage table;
collecting, based on the searched identification information of the edge server, the accumulated data from the corresponding edge server; and
transmitting via the network the collected data to the terminal which is a transmission source of the data acquisition request.

* * * * *